United States Patent [19]

Reymond et al.

[11] 3,873,752

[45] Mar. 25, 1975

[54] PROCESS FOR PREPARING A TEA FLAVOURING AGENT

[75] Inventors: Dominique Reymond, La Tour-de-Peilz, Switzerland; Jean-Paul Marion, Steisslingen, Germany

[73] Assignee: Societe d'Assistance Technique pour Produits Nestle S.A., Lausanne, Switzerland

[22] Filed: Oct. 26, 1972

[21] Appl. No.: 301,099

[30] Foreign Application Priority Data
Nov. 15, 1971 Switzerland.................... 16570/71

[52] U.S. Cl................. 426/369, 426/387, 426/424, 426/429
[51] Int. Cl........................... A23l 1/26, A23f 3/00
[58] Field of Search ......... 99/76, 77, 140 R, 71, 22; 426/386, 387, 427, 428, 429, 435, 424, 365, 366, 369, 193

[56] References Cited
UNITED STATES PATENTS

| | | | |
|---|---|---|---|
| 897,764 | 9/1908 | Meyer, Jr. et al. ..................... | 99/76 |
| 1,868,999 | 7/1932 | Strobach et al. ....................... | 99/77 |
| 2,476,072 | 7/1949 | Tressler ................................. | 99/77 |
| 2,563,233 | 8/1951 | Gilmont ................................. | 99/71 |
| 2,853,387 | 9/1958 | Nutting ................................. | 99/71 |
| 3,418,134 | 12/1968 | Rooker ................................. | 99/77 |
| 3,420,674 | 1/1969 | McCartney ........................... | 99/71 |
| 3,438,785 | 4/1969 | Zamgitat et al....................... | 99/77 |
| 3,477,856 | 11/1969 | Schultz ............................... | 99/77 X |
| 3,532,506 | 10/1970 | Rey et al............................. | 99/77 X |
| 3,554,761 | 1/1971 | Carbonell ........................... | 99/77 X |

FOREIGN PATENTS OR APPLICATIONS 805,269  12/1958  United Kingdom................... 99/77

*Primary Examiner*—Frank W. Lutter
*Assistant Examiner*—Steven L. Weinstein
*Attorney, Agent, or Firm*—Watson Leavenworth Kelton & Taggart

[57] ABSTRACT

A flavouring agent is prepared by treating a solution of aromatic tea constituents in a water-immiscible solvent with an aqueous solution of an alkaline substance and the treated solvent solution is recovered.

10 Claims, No Drawings

PROCESS FOR PREPARING A TEA FLAVOURING AGENT

The present invention is concerned with the preparation of flavouring agents having a tea flavour.

Extraction of the aromatic constituents of tea is most commonly carried out in connection with the preparation of soluble tea extracts by aqueous extraction. The object of this extraction of aromatic constituents from tea is to protect these substances from degradation by the heat treatments associated with the aqueous extraction of soluble tea solids. The aromatic constituents, separated from the raw material prior to aqueous extraction of soluble solids, are subsequently restored to the aqueous extract. The extracted aromatic constituents may also be used as flavouring agents for giving a tea flavour to different food products.

Extraction of the aromatic constituents of tea is preferably effected at a relatively low temperature, for example with a solvent which may be handled and eliminated without any substantial damage, as by heat, to the constituents. On the other hand, this extraction should preferably be conducted in such a manner that substances which develop an undesirable aroma and flavour do not affect the organoleptic properties of the resulting flavouring agent.

The present invention provides a process for preparing a flavouring agent containing the aromatic constituents of tea, in which a solution of at least a part of the aromatic constituents of tea leaf is formed in water-immiscible solvent, the resulting solution is treated with an aqueous solution of an alkaline substance, the aqueous phase is separated from the solvent phase and the solvent phase containing aromatic constituents is recovered.

By the expression "water-immiscible solvent" is meant, in the following specification, a substance capable of extracting at least a part of the aromatic constituents of tea, either directly from tea leaf or from an extract or distillate obtained from tea leaf, and capable of providing a liquid solution of these substances. The term "water-immiscible" is to be interpreted broadly, that is it designates solvents which are completely immiscible with water as well as those which are slightly miscible. Preferred solvents include organic solvents such as petroleum ether, pentane, hexane or halogenated solvents such as freons, as well as liquid carbon dioxide.

The solution of aromatic constituents in a solvent may be prepared in various ways. For example, the aromatic constituents may be extracted from tea leaf which has preferably been finely ground. The extractability of the aromatic constituents may be improved by moistening the tea, for example with a substantially equal weight of water. Extraction may be carried out in continuous manner, by circulating the solvent through an extractor charged with the tea, or by immersion of the tea in a solvent, stirring of the resulting suspension and separation of the liquid and solid phases, for example by filtration and squeezing, or by any other suitable method. The resulting solvent solution, which is substantially anhydrous as water used for moistening is retained in the solid material, contains a major proportion of the aromatic constituents of the tea.

Alternatively, the aromatic constituents may be extracted from tea leaf, generally ground and preferably moistened as before, by stripping with liquid or gaseous carbon dioxide. Gaseous carbon dioxide, when used, is liquefied after stripping to provide a solution of the aromatic constituents.

Furthermore, the solution of aromatic constituents may also be prepared by extraction of an extract or condensate obtained by extraction or stripping these constituents from tea leaf.

The solution of aromatic constituents, either in an organic solvent or in liquid carbon dioxide (which for convenience is referred to hereinafter as "solvent solution"), is then treated with an aqueous solution of an alkaline substance. Preferred alkaline substances are alkali and alkaline earth metal carbonates, bicarbonates and hydroxides, especially sodium carbonate, sodium or potassium bicarbonate, sodium hydroxide or calcium hydroxide. The treatment preferably comprises forming an emulsion of the alkaline solution in the solution of aromatic constituents, usually with stirring for 10 to 20 minutes. The aqueous and solvent phases are then allowed to separate to give two discrete layers. During the treatment, the base in aqueous solution reacts with substances present in the solvent solution, particularly with certain fatty acids liable to develop an unpleasant aroma or flavour, to form salts which dissolve in the aqueous phase, thus removing the reacted substances from the organic solution.

The amount of alkaline solution used is by no means critical, and extremely small amounts have shown to be effective. In practice, the lower limit on the amount of alkaline solution tends to be dictated by practical considerations, notably the desirability of securing adequate mixing of the phases. A convenient rule-of thumb is to take an approximate volume proportion of about 2–3 ml of saturated alkaline solution per litre of solvent solution. The actual amount of alkali, expressed for example in terms of moles per gram of tea from which aromatic constituents are extracted, varies within extremely broad limits, as is shown in the Examples, and reference should be had to the Examples for guidance in determining suitable proportions of alkaline and solvent solutions.

The solvent solution may then be recovered and the solvent eliminated by evaporation, preferably under reduced pressure at a temperature below 30°C. Evaporation may also be effected at reduced pressure in an inert atmosphere such as an atmosphere of nitrogen.

Preferably, the evaporation residue, which contains tea leaf fragments as well as water-insoluble pigments, is dispersed in water, with stirring, at a temperature between 10° and 50°C, whereby at least a part of the aromatic constituents dissolves in the water, and the impurities may be eliminated by filtering the suspension through a material such as cotton wool or gauze to obtain an aqueous solution of aromatic tea constituents. When liquid carbon dioxide is used as solvent it may also be separated from the aqueous phase by direct evaporation.

The resulting aqueous solution may be used as such, as a flavouring agent which may for example be incorporated in a beverage or a food product in which a flavour of tea is desired. It may also be added to an aqueous extract of tea solids. The tea extract, thus fortified with aromatic constituents, may be dried, preferably by freeze-drying, or used in a more or less concentrated liquid or pasty form. The aromatised extract provides, on reconstitution with water, a beverage having the aroma and flavour of an infusion prepared from good quality tea leaf.

Alternatively, the solvent solution of aromatic constituents recovered after treatment with the alkali solution may be added, optionally after concentration, to tea solids and the solvent eliminated, for example by evaporation under reduced pressure. The term "tea solids" means an extract obtained by aqueous extraction. Such an extract may be in dry state, e.g. a powder, or in the form of a liquid or paste.

The invention is illustrated by the following Examples, in which the percentages are expressed on a weight basis.

EXAMPLE 1

500 g of finely ground black tea are moistened by mixing for 20 minutes with 500 ml of water at ambient temperature. The ground moistened tea is then immersed in 2 litres of petroleum ether (boiling point 40°–60°C) for 2 hours with stirring at ambient temperature. The liquid and solid phases of the suspension are separated by filtration and squeezing the cake obtained after filtration so as to express all the solvent. An emulsion is then formed from the separated liquid organic phase (2 litres) and 6 ml of a saturated aqueous solution of sodium bicarbonate (containing 96 g of $NaHCO_3$ per litre of solution), and is gently stirred at ambient temperature for 15 minutes. The aqueous and organic phases are then allowed to separate into two discrete layers and the organic phase is recovered. The solvent solution is then subjected to thin film evaporation under reduced pressure at a temperature of about 20°C in order to eliminate the petroleum ether. 1 ml of evaporation residue is thus obtained which is dispersed with stirring for 10 minutes in 200 ml of water at ambient temperature. The resulting suspension is then filtered through gauze to eliminate the insoluble green pigments and solid particles such as tea leaf fragments.

The aqueous solution of aromatic tea constituents is then added to 390 ml of an aqueous tea extract containing 45 percent solids to provide an aromatised extract containing 30 percent solids. This extract, after freeze-drying, provides on reconstitution with hot water, at a level of 0.5 g extract per 100 ml of hot water, a beverage of which the flavour and aroma are very similar to those of an infusion prepared from good quality black tea.

EXAMPLE 2

2 litres of a solution of aromatic tea constituents in petroleum ether are prepared as described in Example 1. An emulsion is then formed by adding 6 ml of a saturated aqueous solution of calcium hydroxide (containing 1.28 g of $Ca(OH)_2$ per litre) and stirring for 15 minutes at ambient temperature. After separation of the aqueous and organic phases the organic phase is recovered and the petroleum ether is eliminated as described in Example 1. The residue is then dispersed with stirring for 15 minutes in 200 ml of water at ambient temperature. The suspension is then filtered through cotton wool to eliminate the insoluble green pigments and solid particles.

The ground moistened tea which was extracted with petroleum ether is recovered and extracted separately with water. 3 litres of aqueous extract are prepared, which is concentrated by evaporation to provide 330 ml of aqueous extract containing 45 percent solids.

EXAMPLE 3

1 kg of finely ground black tea is moistened by mixing for 20 minutes with 1 litre of water at ambient temperature. The tea is then immersed with stirring for 2 hours at 20°C in 4 litres of liquid Freon 11 (boiling poing 23.8°C). The liquid and solid phases of the suspension are then separated by filtration and squeezing the filtration residue to express the solvent. The liquid organic phase (4 litres) is recovered and emulsified with 12 ml of a saturated aqueous solution of potassium bicarbonate (containing 333 g of $KHCO_3$ per litre of solution). The emulsion is maintained at 20°C for 15 minutes with gentle stirring and the aqueous and organic phases are allowed to separate. The organic phase is recovered and evaporated under reduced pressure. The evaporation residue is dispersed with stirring for 10 minutes in 400 ml of water at ambient temperature and the insoluble green pigments and solid particles are then elimated by filtration through gauze.

An aqueous solution of aromatic tea constituents is thus obtained which is mixed with 800 ml of an aqueous tea extract containing 45 percent solids. The extract enriched with aromatic constituents is then freeze-dried.

EXAMPLE 4

200 g of ground black tea moistened by mixing with 200 ml of water are placed in the extraction column of a carbon dioxide extraction apparatus. This apparatus essentially comprises a jacketed reservoir located above the extraction column, and a second jacketed reservoir located at a level below that of the column and provided with a stirrer, an evacuation valve communicating with the bottom of the reservoir and a pressure feed device consisting of a pressure-lock communicating with the upper part of this reservoir.

The lower reservoir contains 20 ml of saturated aqueous sodium bicarbonate solution and the apparatus is pressurized with gaseous carbon dioxide, the pressure set up being equal to the saturated vapour pressure of liquid $CO_2$ at the temperature of the apparatus, that is 46.6 atm. at 12°C. The carbon dioxide is liquefied and collected in the upper reservoir. 9 litres of liquid $CO_2$ are then allowed to flow slowly through the tea. The carbon dioxde solution of aromatic constituents is collected in the lower reservoir containing the sodium bicarbonate solution. The mixture of liquid carbon dioxide solution and the aqueous solution is vigorously stirred to form an emulsion and the two phases are then allowed to separate. The aqueous solution, being the denser phase, is withdrawn from the lower part of the reservoir, by opening the evacuation valve.

The carbon dioxide solution in the reservoir is then concentrated by evaporation, by heating the lower reservoir by circulating hot water through the jacket whilst lowering the temperature of the upper reservoir to 10°C.

Evaporation is stopped when the volume of concentrated carbon dioxide solution reaches 300 ml.

250 ml of water are then fed to the lower reservoir through the pressure-lock communicating with the upper part of this reservoir. The mixture of carbon dioxide solution and water is vigorously stirred to form an emulsion, the two phases are left to separate into two discrete layers and 250 ml of aqueous solution of aromatic tea constituents are withdrawn. This solution may be used for aromatising a tea extract prior to freeze-drying.

We claim:

1. A process for preparing a flavouring agent containing aromatic constituents of tea, comprising forming a solution of aromatic constituents extracted from tea leaf and a water-immiscible solvent therefor, said solvent solution also containing tea leaf extracted constituents which develop unpleasant odor or flavour, mixing said solvent solution with an aqueous solution of an alkaline substance in an amount sufficient to react said alkaline substance with said constituents of the solvent solution which develop unpleasant odor or flavour whereby said constituents which develop unpleasant odor or flavour are transferred from the solvent solution to said aqueous solution, and then separating the resultant mixture into an aqueous phase and a water-immiscible solvent phase containing aromatic constituents of tea.

2. A process according to claim 1, in which the solution of aromatic constituents in the water-immiscible solvent is formed by extraction of tea leaf with the solvent.

3. A process according to claim 1, in which the solution of aromatic constituents in the water-immiscible solvent is formed by extraction with the solvent of a substance selected from the group consisting of tea extract and tea distillate.

4. A process according to claim 1, in which the water-immiscible solvent is selected from the group consisting of petroleum ether, pentane, hexane, a halogenated organic solvent and liquid carbon dioxide.

5. A process according to claim 1, in which the water-immiscible solvent is carbon dioxide and the solution of the aromatic constituents is formed by stripping of these constituents from tea leaf with gaseous carbon dioxide followed by liquefaction of the carbon dioxide.

6. A process according to claim 1, in which the water-immiscible solvent is carbon dioxide and the solution of the aromatic constituents is formed by extraction of these constituents from tea leaf with liquid carbon dioxide.

7. A process according to claim 1, in which the alkaline aqueous solution comprises water and a substance selected from the group consisting of alkali metal carbonate, alkali metal bicarbonate, alkali metal hydroxide and alkaline earth metal hydroxide.

8. A process according to claim 1, in which the mixture of water-immiscible solvent and alkaline aqueous solution is maintained as an emulsion for from about 10 to about 20 minutes.

9. A process according to claim 1, in which after separation of the aqueous and solvent phases the water-immiscible solvent is eliminated from the solvent phase and the resultant residue is treated with water to form an aqueous solution of at least a part of the residual aromatic constituents.

10. A process according to claim 9, in which the water-immiscible solvent is eliminated by evaporation under reduced pressure at a temperature below 30°C.

* * * * *